United States Patent Office 3,351,646
Patented Nov. 7, 1967

3,351,646
MAGNESIUM AND TIN DERIVATIVES OF STYRENES AND THE PREPARATION THEREOF
Hugh E. Ramsden, Scotch Plains, and John E. Engelhart, Westfield, N.J., assignors to Esso Research and Engineering Company, a corporation of Delaware
No Drawing. Filed Jan. 4, 1965, Ser. No. 423,294
21 Claims. (Cl. 260—429.7)

The present invention relates to certain novel organomagnesium compounds and to a novel method for preparing them.

Organomagnesium halides have long been known and used as the conventional Grignard reagents. It is a generally accepted fact that Grignard reagents are suitable for use in laboratory preparations of organometallic compounds and derivative materials but are regarded as far too expensive for use in commercial operations.

It has also been proposed to prepare halogen-free organomagnesium compounds by the reaction of magnesium metal or magnesium hydride with a number of hydrocarbon materials. For example, Barber U.S. Patents 2,788,377 issued Apr. 9, 1957, and 2,933,537 issued Apr. 19, 1960, disclose the preparation of bis(cyclopentadienyl) magnesium or mixtures of bis-(cyclopentadienyl) magnesium and bis (methyl-, or lower alkylcyclopentadienyl) magnesium by direct reaction of cyclopentadiene or methyl cyclopentadiene with metallic magnesium at temperatures of at least 450° C. and ranging up to as high as 1000° C. This reaction occurs because of the highly acidic character of the hydrogens of cyclopentadiene. The equation for this reaction is as follows:

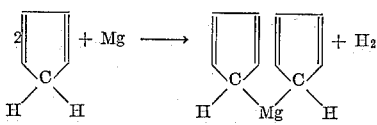

U.S. Patent No. 2,959,625 issued Nov. 8, 1960, to Blitzer et al. and U.S. Patent No. 2,985,692 issued May 23, 1961, to Podall disclose the preparation of alkyl magnesium compounds by reacting an olefin hydrocarbon with magnesium hydride in a reaction medium and in the presence of a catalyst. The equation for this reaction using ethylene as the olefin hydrocarbon is as follows:

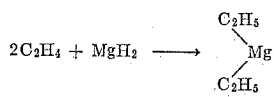

It has now been found that halogen-free organomagnesium compounds can be prepared by reacting metallic magnesium with styrene and $C_1$–$C_7$ alkyl or alkoxyl or aryloxyl substituted styrenes alone or in admixture with (a) $C_4$–$C_{40}$ acyclic conjugated diolefins or (b) $C_{12}$–$C_{40}$ condensed ring aromatic hydrocarbons preferably containing at least three condensed rings or in admixture with (a) and (b).

In this invention the magnesium adds to the styrene without displacing hydrogen as in the case of reaction of magnesium with cyclopentadiene or the addition of hydrogen as in the case of reaction of magnesium hydride with olefins. Styrene reacts with activated magnesium in accordance with the following equation

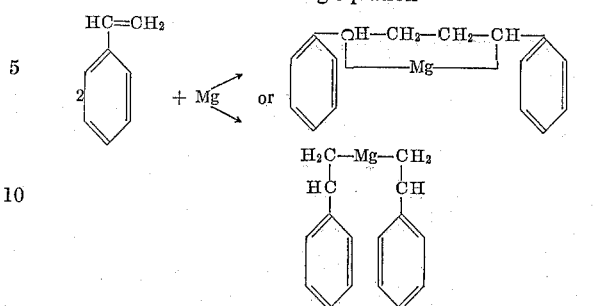

Thus 2 moles of styrene added to one gram atom of magnesium in a suitable solvent such as tetrahydrofuran to yield a brown-black solution with virtually all of the magnesium in solution.

Using one mole of isoprene and one mole of styrene with one gram atom of magnesium the reaction is as follows

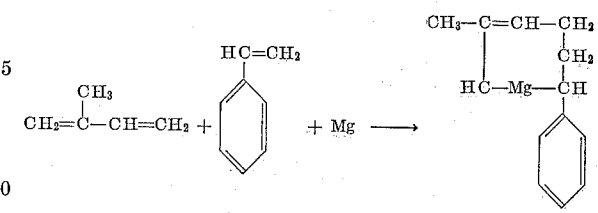

and with one mole of anthracene and one mole of styrene per gram atom of magnesium the reaction is as follows:

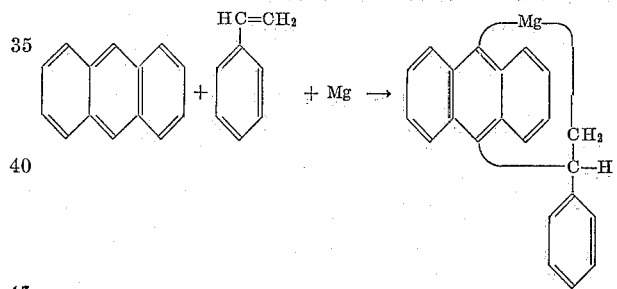

The several styrene-magnesium, styrene-conjugated diolefin-magnesium and styrene-condensed ring aromatic-magnesium adducts prepared in accordance with the present invention are all moderately active as Grignard reagents, reacting with air and moisture. They may be subjected to further reaction to form a variety of valuable derivative materials. The styrene-magnesium adduct may be reacted with carbon dioxide to form diphenyl adipic acid which may be used or further modified for use in the manufacture of synthetic fibers, films and coatings, plasticizers and synthetic lubricants. In addition these adducts may be reacted with any of the many other reactants normally associated with Grignard chemistry such as oxygen, alkylene oxides, chlorhydrin reactants, aldehydes, ketones, sulfur, sulfur dioxide, sulfur trioxide, thionyl chloride, dialkyl sulfates, cyanogen chloride, haloamines, esters, anhydrides as well as various metal salts or organometallic compounds such as tin halides or alkyltin halides, to form valuable vinyl resin stabilizers, antiwear lubricant additives and fungicidal materials.

Examples of the styrene and $C_1$–$C_7$ alkyl, alkoxyl and aroxyl substituted styrenes are methyl styrenes, butyl styrenes, heptyl styrenes, methoxy styrenes, ethoxy styrenes, phenoxy styrenes in each case substitution being e.g. on the alpha carbon atom or on any other carbon atom of the ring.

The diolefins and condensed ring aromatics that can be used in conjunction with styrene to form mixed adducts are as follows: $C_4$–$C_{40}$, preferably $C_4$–$C_{10}$ acrylic conjugated diolefins (including substituted acyclic diolefins where the substituents can be cyclic or acyclic) such as butadiene, isoprene, piperylene, hexadiene, myrcene, 2,3-dimethylbutadiene, 2-phenylbutadiene and the like. Generically these conjugated diolefins may be described as follows:

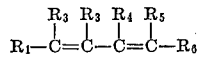

where $R_1$, $R_2$, $R_3$, $R_4$, $R_5$ and $R_6$ may be the same or different and are selected from the class consisting of hydrogen, alkyl, alkenyl, cycloalkyl, cycloalkenyl, aryl, aralkyl, alkadienyl, etc. radicals.

$C_{12}$–$C_{40}$, preferably $C_{12}$–$C_{30}$ condensed ring aromatic hydrocarbons, more preferably aromatic hydrocarbons containing at least 3 condensed rings and at least one internal quinonoid linkage such as anthracene, naphthacene and the like. Other preferred materials are substituted athracenes such as rubrene and pyrene. Phenanthrene and chrysene may also be used but they are less reactive. These hydrocarbons when used are used in a ratio of about one mole per mole of styrene.

The reaction of the styrene, styrene-diolefin or styrene condensed ring aromatic hydrocarbon mixtures with magnesium can be accelerated by violently agitating the reaction mixture, reducing the size of the metallic magnesium particles, i.e. using turnings, pellets, granules or even powdered magnesium. The magnesium is desirably activated as by treatment with a small amount of ethylene bromide. The reaction with styrene is rather sensitive and should be initiated as with ethylene bromide with only a small amount of styrene present whereupon the remainder of the styrene is added very gradually. Sometimes the reaction can be facilitated by first forming a small amount of an isoprene-magnesium adduct before starting the addition of the styrene, styrene-diolefin or styrene-condensed ring aromatic addition.

In addition, the reaction can be satisfactorily initiated by the use of iodine or bromine or mercuric halides together with magnesium metal. This procedure results in the formation of a magnesium-magnesium halide couple which is likely the active species for initiation of this reaction. The amount of magnesium used in the process can vary considerably but is usually about one gram atom for each two moles of hydrocarbon used.

The reaction is effected in the presence of a solvent or reaction medium such as high boiling, e.g. above 100° C. mononuclear aromatic hydrocarbons, e.g. benzene, toluene, xylene, mesitylene, diethyl benzenes, cumenes, etc., high boiling, e.g. above 60° C. ethers and polyethers, e.g. n-butyl ether, mixed alkyl aryl ethers (e.g. anisole), diethyl carbitol, and high boiling saturated paraffinic hydrocarbons, e.g. isooctane, n-octane, kerosene, mineral spirits.

The preferred medium in which to carry out the present invention is one comprising a $C_4$ to $C_{20}$, preferably a $C_4$ to $C_{12}$, saturated cyclic ether such as tetrahydrofuran, tetrahydropyran and the lower alkyl or lower alkoxy derivatives thereof, e.g. methyl tetrahydrofuran, ethyl tetrahydropyran, ethoxy tetrahydrofuran, methoxytetrahydropyran and the like. The dialkyl ethers of alkylene and polyalkylene glycols having lower alkyl groups, i.e. $C_1$ to $C_6$, such as the dimethyl, methyl ethyl, diethyl, ethyl propyl, methyl butyl, etc. ethers of ethylene, diethylene, triethylene, tetraethylene and propylene glycols are also especially suitable as reaction media. Inert liquids such as the above-described hydrocarbons and alkyl ethers can be used in conjunction with these preferred cyclic and alkylene and polyalkylene glycol ethers and, of course, will form a part of the reaction medium when dispersions of magnesium hydrocarbons and/or alkyl ethers are employed. When the cyclic, alkylene- or polyalkylene glycol ethers are used in conjunction with another solvent, it is preferred to have the cyclic, alkylene- or polyalkylene glycol ether present in an amount of from 0.25 to 2 or more moles per gram atom of magnesium.

The styrenes or mixtures of styrenes with conjugated diolefins such as isoprene or condensed ring aromatics such as anthracene or the like react with magnesium to form the desired adducts at temperatures ranging from 20 to 150° C. and, if desired, a small amount of a suitable activator such as ethylene bromide and a few milliliters of the reaction medium to the reaction vessel. A small amount of the hydrocarbon reactant is then added and the reaction mixture gradually heated to initiate the reaction whereupon further amounts of the reactant hydrocarbons are added. The reaction mixture is finally heated at reflux temperature, e.g. about 65 to 110° C. for a period of hours, e.g. about 12 to about 48 hours to complete the reaction. It is desirable to subject the reaction mixture to vigorous agitation. Since the magnesium-hydrocarbon adducts produced in accordance with the present invention are sensitive to moisture and oxidation, it is highly desirable to carry out the process under anhydrous conditions and to blanket the reaction mixture with an inert gas such as nitrogen.

The magnesium-styrene, etc. adducts are isolated as such by filtration, crystallization, or evaporation or may be converted to other useful products directly.

The styrene, etc.-magnesium adducts prepared in accordance with the present invention can be reacted with metal salts or organometallic salts to form new organotin compounds, new organosilicon and silicanes, new organo lead and organomolybdenum compounds, new phosphines, boranes, organoantimony, mercurials.

In addition to those reactions specifically mentioned, the styrene, etc., magnesium adducts may be reacted with any of the many other reactants normally associated with Grignard chemistry such as oxygen, alkylene oxides, aldehydes and ketones, sulfur, sulfur dioxide, sulfur trioxide, thionyl chloride, dialkyl sulfates, cyanogen chloride, haloamines, esters, anhydrides and the like. In this way, a wide variety of useful products can be prepared from the original aromatic hydrocarbons.

The following examples will further serve to illustrate the present invention.

*Example 1.—Styrenemagnesium*

To one gram atom (24.3 g.) of magnesium turnings was added 3 ml. of tetrahydrofuran (THF) and 2 ml. of ethyl bromide as initiator. As soon as initiation began (as evidenced by boiling and evolution of heat) a mix of 2 moles (208 g.) of styrene in 400 ml. of THF was added very slowly with stirring. The temperature rose rapidly to 55° C. over a period of 2 minutes and then started to drop. Heat was applied and the addition continued. After 6 hrs. 17 min. addition and heating were interrupted (T=77° C.—250 ml. in) overnight. After 3 hrs. 30 min. of heating in the morning (at 78° C.) a Gilman test was made—it was negative—i.e. no Grignard present. Two ml. of butyl bromide was added—a vigorous reaction then ensued and addition was continued. All being added over a period of 2 hrs. 22 min. Temperature fell to 55° C. Heating was continued as was stirring for 32 hours—with a stopping of heating overnight (heated 8:15–8:30 a.m. to 4:30 p.m.); stirring was continued overnight. The solution went to light yellow, then amber and finally very deep brown-black.

Example 2.—Styrenedibutyltin

An organotin compound was made from this Grignard of Example 1 by adding a solution of one mole of dibutyltin dichloride in 150 ml. of tetrahydrofuran slowly to the styrenemagnesium. The addition was exothermic during the whole of the addition, it being necessary to heat only after addition was completed. A complete consumption of the magnesium compound had occurred. The magnesium chloride was removed by washing with 200 ml. of water and separating layers. The organotin product is then recovered by evaporation of solvent.

Example 3.—Isoprenestyrenemagnesium

By the process of Example 1 a mixture of one mole of isoprene and one mole of styrene in 400 ml. of tetrahydrofuran was added to magnesium turnings (one g. at 24.3 g.) activated by 1 ml. of ethylene dibromide in 3 ml. of THF. Within eight minutes the solution became bright yellow in color and then over a period of 10 minutes it became deep green black. It was heated for a further 32 hours after addition the temperature rising from 63° C. to 69.5° C. as the isoprene reacted. Very little magnesium was left unreacted.

Example 4.—Isoprenestyrenedibutyltin

One mole (303.7 g.) of dibutyltin dichloride in 200 ml. of tetrahydrofuran was added to the isoprenestyrenemagnesium of Example 3 by the process of Example 2 to yield isoprenestyrenebutyltin. The reaction was exothermic throughout the addition. Extra solvent was needed during the course of the addition as the mixture had a tendency to form a soft gel.

Example 5.—Butadienestyrenemagnesium

By the process of Example 3, a mixture of one mole (54 g.) butadiene (an excess of 10 grams was used) and one mole (104 g.) of styrene in 300 ml. of tetrahydrofuran was added to one gram-atom of magnesium turnings (24.3 g.) activated by 1 ml. of ethylenedibromide and 3 ml. of THF. A reflux condenser of the Scott type using solid carbon dioxide as the coolant was necessary to prevent loss of the butadiene. Reflux was maintained by external heating for 18 hours during which time the temperature of reflux went from 38° C. to 68° C.

Two moles (116 g.) of propylene oxide in 500 ml. of benzene was added in a strongly exothermic reaction to form butadienestyrenebispropanol as a benzene solution (after washing with acidified water to remove magnesium salts).

Example 6.—Anthracenestyrenemagnesium

A mixture of one mole of anthracene (178 g.) and one mole of styrene in 500 ml. of tetrahydrofuran was added to activated magnesium (as in Example 5) as rapidly as possible without discharging the green color. External heating was necessary—the addition taking 1 hr. 10 min. The mixture was heated at reflux for 8 hours longer, and a black-green solution was obtained as compared to the orange solid obtained with anthracene alone. This material was converted to an organotin compound as described in Example 4.

Example 7.—Anthracenestyrenedibutyltin

By the process of Example 4, one mole of dibutyltin dichloride in 100 ml. of benzene added to the anthracenestyrenemagnesium of Example 6 yielded 516.7 grams of a crude anthracenestyrenedibutyltin analyzing 21.1% Sn (theory 24.7%).

Example 8.—Diphenyladipic acid

To 12.2 g. of clean, dry magnesium turnings in a 1-liter round bottomed flask was added 1 g. dibromoethane dissolved in 3 ml. tetrahydrofuran—the reaction mixture became warm and the magnesium began to assume a grayish appearance whereupon 10 ml. isoprene dissolved in 25 ml. tetrahydrofuran was added dropwise and the mixture assumed a characteristic green color. A solution of 104 g. styrene in 150 ml. tetrahydrofuran was then added dropwise to the refluxing solution over a 7 hr. period. Refluxing was continued for an additional 30 hr. period to insure complete reaction of the styrene and the dark green reaction mixture was then poured onto an excess of Dry Ice suspended in tetrahydrofuran. The reaction mixture was then acidified with dilute hydrochloric acid, extracted with pentane and the pentane extract was extracted with 20% sodium hydroxide solution. The basic extract was reacidified with hydrochloric acid and the product extracted with pentane—the pentane extracts were dried over sodium sulfate, filtered and most of the pentane removed with a rotary concentrator—the last traces of pentane were removed by blowing with a nitrogen stream and the final product was air dried in a Pyrex dish to yield a light yellow crystalline product, yield 51 g.

From the aqueous extracts was obtained another 15 g. of slightly more impure product. Total yield of diphenyladipic acid—66 g. (52% based on recovered magnesium metal).

The infrared spectrum of this compound shows the expected strong carbonyl absorption at $5.8\mu$.

Example 9.—α-Methylstyrenemagnesium

Two moles of 2-methylstyrene in 400 ml. of tetrahydrofuran added to activated magnesium turnings by the process of Example 1 yields α-methylstyrenemagnesium, convertible by the process of Example 2 to α-methylstyrenedibutyltin.

Example 10.—Preparation of a hindered diol from 1,1-disubstituted olefin-magnesium product To 12.2 g. of clean, dry magnesium turnings in a 1-liter round-bottomed flask is added 1 g. of dibromoethane dissolved in 3 ml. of tetrahydrofuran. After the reaction mixture becomes warm and the magnesium assumes a grayish appearance 10 ml. of isoprene dissolved in 25 ml. of THF is added dropwise while the mixture assumes a characteristic green color. A solution of 118 g. of α-methylstyrene in 150 ml. THF is added dropwise over a 6 hr. period and refluxing is continued for an additional 40 hours to insure complete reaction. To this organomagnesium intermediate is added a 10-fold molar excess of gaseous formaldehyde and the mixture is stirred for an additional 6 hrs. The reaction mixture is then hydrolyzed with ammonium chloride solution, acidified with dilute hydrochloric acid and extracted with ether. The ether extracts are neutralized with a sodium carbonate solution washed with water and dried over sodium sulfate. Evaporation of the ether gives 2,5-dimethyl-2,5-diphenyl-1,6-hexanediol in good yields.

Example 11.—Oxidation of distyryl magnesium

To 12.2 g. of clean, dry magnesium turnings in a 1-liter round bottomed flask was added 1 g. dibromoethane dissolved in 3 ml. tetrahydrofuran. After the reaction mixture became warm and the magnesium assumed a grayish appearance 10 ml. of isoprene dissolved in 25 ml. tetrahydrofuran was added dropwise and the mixture assumed a characteristic green color. A solution of 104 g. styrene in 150 ml. tetrahydrofuran was then added dropwise to the refluxing solution over a 7 hr. period. Refluxing was continued for an additional 30 hr. to insure complete reaction of the styrene. To the dark green reaction mixture is added an additional 300 ml. of tetrahydrofuran and the mixture is treated with a steady stream of dry, carbon dioxide-free air for a period of about 10 hrs. The temperature is held at 0–10° C. during this time and finally the reaction mixture is hydrolyzed with ammonium chloride solution and acidified with dilute hydrochloric acid. The product diol mixture is extracted with 3 portions of ether, the ether extracts are neutralized with sodium carbonate and then the extracts are washed to neutrality and dried over sodium sulfate. Evaporation of the ether solvent yields a mixture of diphenylbutanediols particularly the 1,4-diphenyl-1,4-butanediol. Yields are high.

*Example 12*

By the process of Example 1 using ethyl bromide to initiate the reaction 0.25 mole of styrene, 0.25 mole of isoprene plus 0.5 mole of anthracene in 400 cc. of THF were reacted for 8 hours. The solution on washing became a hard glassy black, extremely viscous semi-solid material which was slowly broken up by adding additional THF.

While the foregoing specification contains a limited number of embodiments of this invention, it will be understood that numerous variations are possible without departing from the scope of the following claims.

What is claimed is:

1. An adduct of magnesium with a styrene compound selected from the group consisting of styrene and $C_1$ to $C_7$ alkyl, alkoxyl and aroxyl substituted styrenes.
2. The compound of claim 1 in which the ratio of aromatic hydrocarbon to magnesium is 2:1.
3. Styrenemagnesium.
4. Styrenedibutyltin.
5. Isoprenestyrenemagnesium.
6. Isoprenestyrenedibutyltin.
7. Butadienestyrenemagnesium.
8. Anthracenestyrenemagnesium.
9. Anthracenestyrenedibutyltin.
10. α-Methylstyrenemagnesium.
11. The process for preparing organomagnesium compounds which comprises maintaining magnesium metal in contact with a styrene compound selected from the group consisting of styrene and $C_1$ to $C_7$ alkyl, alkoxyl and aroxyl substituted styrenes in the presence of a saturated cyclic ether for a period sufficient to form an adduct of magnesium with the said styrene compound.
12. The process of claim 11 in which the reaction is carried out in the presence of a $C_4$ to $C_{20}$ saturated cyclic ether.
13. The process of claim 12 in which the magnesium is contacted with the styrene compound in admixture with a material selected from the group consisting of $C_4$ to $C_{40}$ acyclic conjugated diolefins, $C_{12}$ to $C_{40}$ condensed ring aromatic hydrocarbons, and mixtures of these.
14. The process of claim 12 in which saturated cyclic ether is an ethoxy ether.
15. The process of claim 11 in which the reaction is carried out at temperatures of 20 to 170° C. for a period of 8 to 48 hours.
16. The process of claim 12 in which the reaction is initiated with a Grignard activator and the reaction is carried out at temperatures of 20 to 170° C. for a period of 8 to 48 hours.
17. The process of claim 12 wherein the styrene compound is styrene.
18. The process of claim 13 wherein the magnesium is contacted with a mixture of styrene and isoprene.
19. The process of claim 16 wherein the reaction is conducted in the presence of a $C_4$–$C_{12}$ saturated cyclic ether.
20. The process of claim 19 wherein the ether is tetrahydrofuran.
21. The process of claim 20 wherein the styrene compound is styrene.

References Cited

UNITED STATES PATENTS

| | | | |
|---|---|---|---|
| 2,999,889 | 9/1961 | Foster et al. | 260—665 |
| 3,168,582 | 2/1965 | Aufdermarsh | 260—665 |

OTHER REFERENCES

Mathias et al., Faraday Society Transactions, volume 58 (1962), pages 948 to 952.

TOBIAS E. LEVOW, *Primary Examiner.*

W. F. W. BELLAMY, *Assistant Examiner.*